US009626084B2

(12) United States Patent
Waggoner et al.

(10) Patent No.: US 9,626,084 B2
(45) Date of Patent: Apr. 18, 2017

(54) OBJECT TRACKING IN ZOOMED VIDEO

(71) Applicant: Amazon Technologies, Inc., Reno, NV (US)

(72) Inventors: Charles Benjamin Franklin Waggoner, Mountain View, CA (US); Colin Jon Taylor, Orinda, CA (US); Jeffrey P. Bezos, Seattle, WA (US); Douglas Ryan Gray, Mountain View, CA (US)

(73) Assignee: Amazon Technologies, Inc., Reno, CA (US)

( * ) Notice: Subject to any disclaimer, the term of this patent is extended or adjusted under 35 U.S.C. 154(b) by 346 days.

(21) Appl. No.: 14/283,554

(22) Filed: May 21, 2014

(65) Prior Publication Data
US 2015/0268822 A1    Sep. 24, 2015

Related U.S. Application Data

(60) Provisional application No. 61/968,872, filed on Mar. 21, 2014.

(51) Int. Cl.
*G06F 3/0484*    (2013.01)
*G06F 3/0488*    (2013.01)

(52) U.S. Cl.
CPC ........ *G06F 3/04842* (2013.01); *G06F 3/0488* (2013.01)

(58) Field of Classification Search
CPC . G06F 3/00; G06F 3/011; G06F 3/017; G06F 3/041; G06F 3/16; G06F 3/048; G06F 3/0481; G06F 3/0482; G06F 3/0488; G06F 3/04842; G06F 2203/04806; G06F 2203/04808; G06F 3/0484; G09G 5/37;
(Continued)

(56) References Cited

U.S. PATENT DOCUMENTS

| 8,004,565 B2 * | 8/2011 | Herz | G06T 7/2033 |
| | | | 348/161 |
| 2010/0321533 A1 * | 12/2010 | Park | G06F 3/0481 |
| | | | 348/239 |

(Continued)

OTHER PUBLICATIONS

International Search Report and Written Opinion issued in corresponding International Application No. PCT/US2015/020238 dated Jun. 15, 2015.

*Primary Examiner* — Xiomar L Bautista
(74) *Attorney, Agent, or Firm* — Hogan Lovells US LLP

(57) ABSTRACT

A user can select an object represented in video content in order to set a magnification level with respect to that object. A portion of the video frames containing a representation of the object is selected to maintain a presentation size of the representation corresponding to the magnification level. The selection provides for a "smart zoom" feature enabling an object of interest, such as a face of an actor, to be used in selecting an appropriate portion of each frame to magnify, such that the magnification results in a portion of the frame being selected that includes the one or more objects of interest to the user. Pre-generated tracking data can be provided for some objects, which can enable a user to select an object and then have predetermined portion selections and magnifications applied that can provide for a smoother user experience than for dynamically-determined data.

24 Claims, 10 Drawing Sheets

(58) Field of Classification Search
CPC ...... G09G 5/373; H04N 5/44543; H04N 7/15; H04N 21/4622; G06Q 50/01; G06Q 30/02; G06Q 10/10; G10L 15/265; G11B 27/034; G11B 27/34; G11B 37/34
See application file for complete search history.

(56) References Cited

U.S. PATENT DOCUMENTS

| | | |
|---|---|---|
| 2011/0137753 A1 | 6/2011 | Moehrle |
| 2011/0246560 A1 | 10/2011 | Gibson |
| 2011/0249861 A1* | 10/2011 | Tokutake ............ G06F 17/3079 382/103 |
| 2011/0299832 A1* | 12/2011 | Butcher ......... H04N 21/234318 386/248 |
| 2012/0092381 A1 | 4/2012 | Hoover et al. |
| 2013/0009997 A1 | 1/2013 | Boak et al. |
| 2014/0153908 A1* | 6/2014 | Murakami ........... H04N 5/4403 386/343 |

* cited by examiner

OBJECT TRACKING IN ZOOMED VIDEO

CROSS-REFERENCE TO RELATED APPLICATION

This application claims priority to U.S. Provisional Application 61/968,872, filed Mar. 21, 2014, entitled "Object Tracking in Zoomed Video," which is hereby incorporated herein by reference for all purposes.

BACKGROUND

As the capabilities of various computing devices expand, users are increasingly utilizing these devices to perform a variety of tasks. For instance, users are increasingly watching video content on devices such as smart phones and tablet computers. Unfortunately, much of the video content available was created for a large screen, such that there can be many objects represented in a frame of video at any time, with many of those objects being relatively small with respect to the size of the screen. When displaying such content on a device, such as a smart phone, with a relatively small display size, it can be difficult for a user to observe things like fine details, facial expressions, and the like. As the resolution of video content is increasing, it can be possible for a user to adjust a display setting to display only a region of the video content. The region selected will generally be relatively static, such that an object of interest to the user might be positioned and/or move outside the selected region. Further, the selected region might be appropriate for some scenes of the video but not others.

BRIEF DESCRIPTION OF THE DRAWINGS

Various embodiments in accordance with the present disclosure will be described with reference to the drawings, in which.

DETAILED DESCRIPTION

Figure 1A:
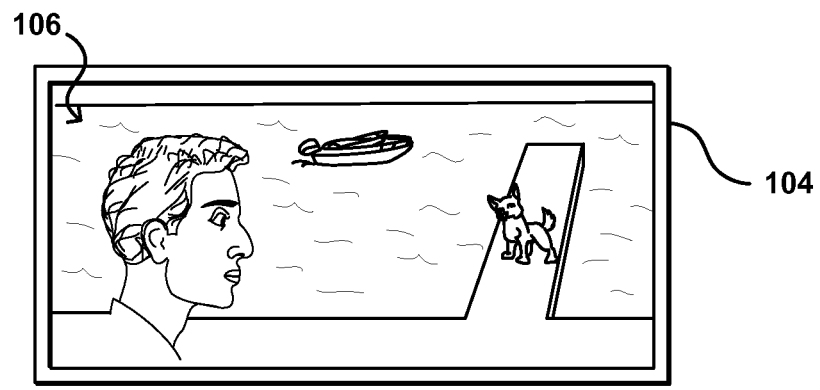
FIGS. 1(a)-1(b) illustrate environments in which a user is able to view video content on different electronic devices in accordance with various embodiments.

Systems and methods in accordance with various embodiments of the present disclosure may overcome one or more of the aforementioned and other deficiencies experienced in conventional approaches to providing and/or displaying content using an electronic device. In particular, various embodiments enable a user to specify/select one or more objects of interest to be tracked in video content displayed on a computing device or other presentation device. In some embodiments, a user can select an object by specifying, using an input element (e.g., two or more fingers), a boundary around the object, and then specify a magnification level by adjusting a separation of at least two of those fingers. A location of a representation of that object (e.g., the object of interest) within the video can be determined whenever the representation is determined to be present in a frame of video to be displayed. Likewise, in some embodiments, the location of the representation of the object, when the object is included in a frame, may be approximately centered (in the displayed portion) and displayed with a presentation size that corresponds with the magnification level specified by the user. Such an approach provides what is referred to herein as a "smart zoom," as frames or segments of the video that include the object of interest can be "zoomed in," enabling a greater level of detail to be seen, particularly on devices with relatively small and/or low resolution display screens. Algorithms can be used to track the representation of the object between different frames, and track the representation of the object even if it undergoes various deformations of appearance (e.g., turns to the side). In some embodiments, different magnification levels can be set for different objects, or types of objects. For scenes without representations of those objects, the magnification level can be set to a default level, such as a level defined by a source of the content, an original content level, a fully zoomed out level, or full screen view. The amount by which a magnification or centering of an object can be performed can depend on various factors, such as the size of the representation of the object in the frame, the proximity of the representation to an edge of the presented content, the resolution of the video content, and other such factors.

In some embodiments, tracking data for an object of interest can be determined dynamically (e.g., computations completed by a processor of the computing device). In some embodiments, tracking data can be determined offline, which can then be accessed for use with a display of the corresponding video content. While the tracking data determined offline does not provide for selection of random objects, the predetermined data can reduce processor load on the computing device as opposed to determining the data in real time. In some embodiments, tracking data can be shared among users, such as by enabling tracking data to be accessible via a social network. In some embodiments, the portion of video to be displayed can enable only a subset of the video data to be transmitted, such as a subset of video streams or subset of video tiles, which can also save on bandwidth and memory usage.

Various other applications, processes and uses are presented below with respect to the various embodiments.

Figure 1B:
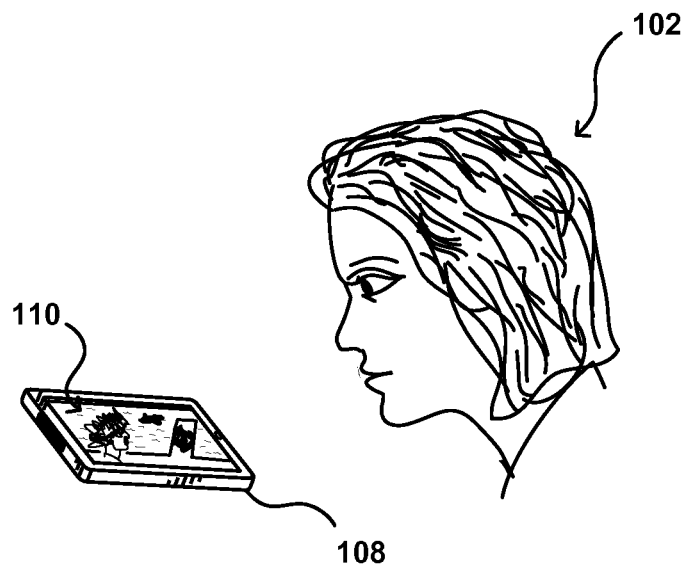

FIGS. 1(a)-1(b) illustrates an example situation in which a user 102 is able to view the same video content on different devices. In FIG. 1(a), the user is viewing a first version 106 of video content on a large format device, in this case a flat screen television 104. Due at least in part to the size and resolution of the television, the user 102 is able to view the content at a relatively high resolution, such as 4K or 8K, and is still able to discern small details in the video content. In addition, under such conditions, the user is able to view other aspects, such as changes in facial expressions and small movements of the various objects (e.g., dog wagging tail). In FIG. 1(b), the user 102 is also able to view a second version 110 of the same (or similar) video content on another device, such as a portable computing device 108. Although a portable computing device (e.g., a smart phone, an e-book reader, or tablet computer) is shown, it should be understood that various other types of electronic devices which are capable of displaying video content can be used in accordance with various embodiments discussed herein. These devices can include, for example, desktop computers, notebook computers, personal data assistants, video gaming consoles or controllers, wearable computers (e.g., a smart watch or glasses), and portable media players, smart phones, among others. The portable computing device 108 has a display screen that is much smaller (e.g., 8.9" or smaller screen), and potentially much lower in resolution, than the television 104 (FIG. 1(a)). The difference in screen size can result in the user being unable to view a satisfactory level of detail in the content displayed via the portable computing device 108. Even if the user is able to play the same, high resolution version on both devices, the size of the display on the portable computing device can prevent the user from obtaining (e.g., viewing) the desired level of detail.

Figure 2A:
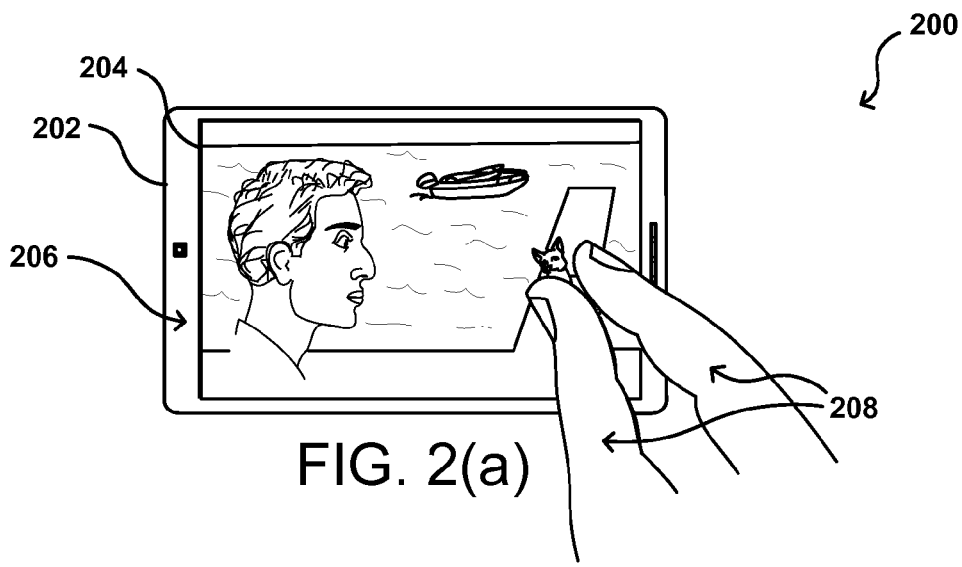
FIGS. 2(a), 2(b), and 2(c) illustrate an example approach enabling a user to adjust a magnification of displayed video in accordance with various embodiments.

Approaches in accordance with various embodiments can enable a user to adjust a magnification level of a presentation of video content in order to obtain, for selected object(s), a level of detail or view that is acceptable to the user. As an example, FIG. 2(a) illustrates an example situation 200 wherein a user is able to view a presentation of video content 206 on a touch-sensitive display 204 of a computing device 202. In this example, the video content 206 is being displayed with a default magnification, such that the aspect ratio of the video content substantially matches the shape and size of the touch-sensitive display, although other default magnifications can be specified or selected as well. For example, video content with an aspect ratio different from that of the display can be fit into the display and have "bars" on the top and bottom or sides (e.g., letterbox view), or can be magnified such that all the area of the display is used to display content even though a portion of each frame will fall outside the display area (e.g., full screen view). Other default settings can be used as well. In some embodiments, the default setting can correspond to a magnification level of 0 or 1, depending upon convention.

Figure 2B:
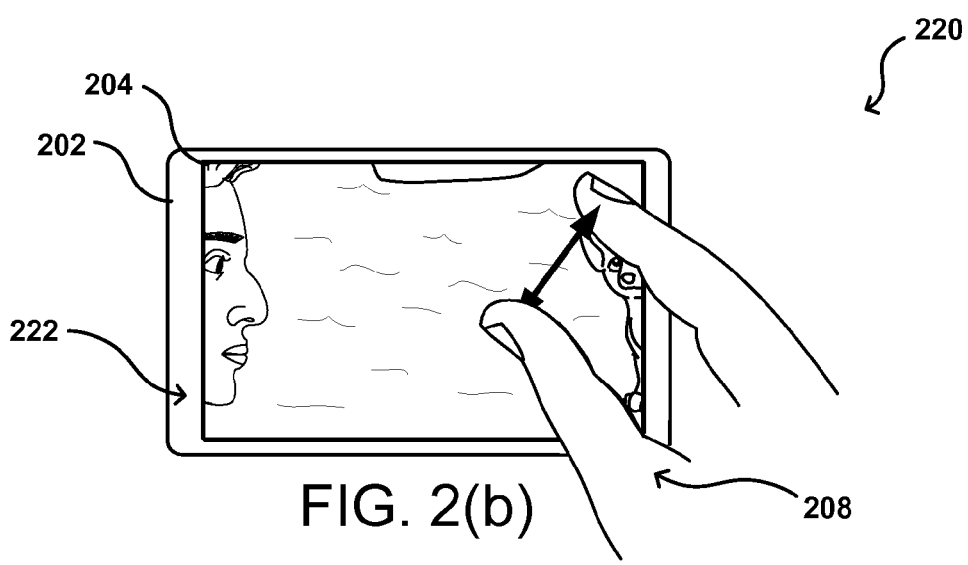

It is possible that the user will want to "zoom in" or otherwise increase a magnification level of the video content. In some embodiments, a user might be able to select a slider bar or other interface element in order to adjust the magnification. In this example, the user is able to place their fingers 208 proximate to each other on, or sufficiently near to, a surface of the touch-sensitive display to specify a boundary around an object. For example, if the user places two fingers on the touch-sensitive display, the operating system of the device may identify the two contact points on the touch-sensitive display as opposing corners of a bounding area (e.g., rectangle, square, octagon) and generate other corners as specified distances from the contact points, thereby establishing a boundary area based on the inputs provided by the user. In another implementation, the inputs from the user's two fingers may be used to identify a center point, such as a point equidistant from the two inputs, as the center point around which any specified magnification is to be performed. Approaches for providing touch input to a touch-sensitive display, such as through capacitive input, are well known in the art and as such will not be discussed in detail herein. As illustrated in the example situation 220 of FIG. 2(b), the user can then separate their fingers 208 along the touch-sensitive display in order to adjust a magnification level of the video content displayed. In at least some embodiments, a user can "pinch" their fingers together to decrease a magnification level and separate their fingers to increase a magnification level, although other options can be utilized as well. The amount of magnification change can depend upon the amount of change in separation of the fingers. The rate at which magnification level changes with finger separation can be configurable, in at least some embodiments, similar to ways in which a user can adjust the effective "speed" of a mouse or other input device.

Figure 2C:
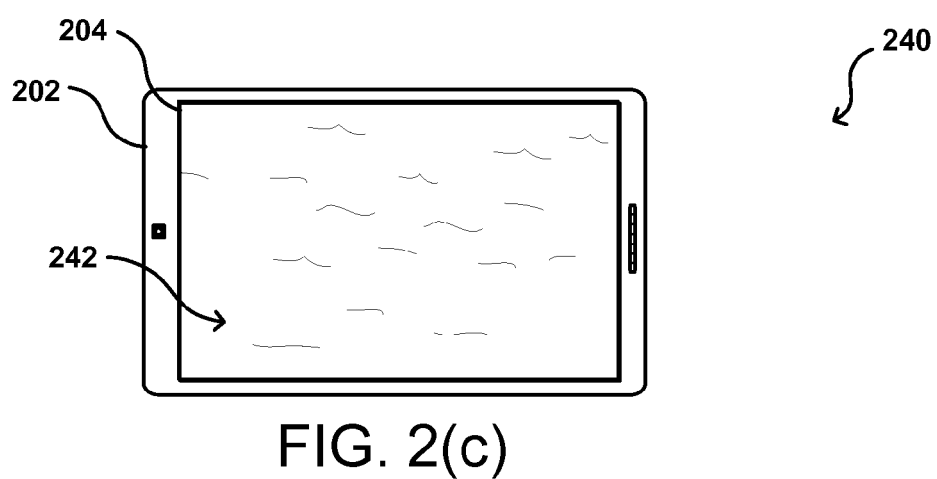

The ability to adjust the magnification level enables the user to cause a selected portion 222 of each video frame to be displayed, where the size of the portion is determined at least in part by the magnification level. Unfortunately, in at least some embodiments, a magnification change alone can result in portions of the displayed video not containing any objects of interest. For example, the situation 240 illustrated in FIG. 2(c) illustrates a portion of a frame of video 242 displayed at the magnification level set in FIG. 2(b). The magnification change in this example causes a portion of the video content to be selected which is relatively static, such as a portion about the center point of the frame that shows 75% of the frame. In this example, the objects of interest are outside that 75%, so the portion may not show anything of particular interest. Thus, the ability to adjust magnification level alone may not be sufficient to provide an adequate user experience for at least some video content.

Approaches in accordance with various embodiments enable a user to select a specific object represented in the video content. By receiving a selection of an object, the video content can be displayed so that the object remains approximately centered in the display, in at least some embodiments, when that object is represented in a frame of the video content. In other embodiments, the objects of interest might remain at, or near, the default or selected position of each object, but at the selected magnification level or presentation size. Further, a magnification level associated with that object can be utilized to cause the video to be displayed with the magnification level whenever that object is recognized to be represented in a frame of video to be displayed. In some embodiments, the magnification level can be predetermined, such that a user can select an object to be a point of focus, and the predetermined magnification level applied. In other embodiments, the user can also specify a magnification level, or presentation size, to be used when the object is represented in a frame of video to be displayed.

Figure 3A:
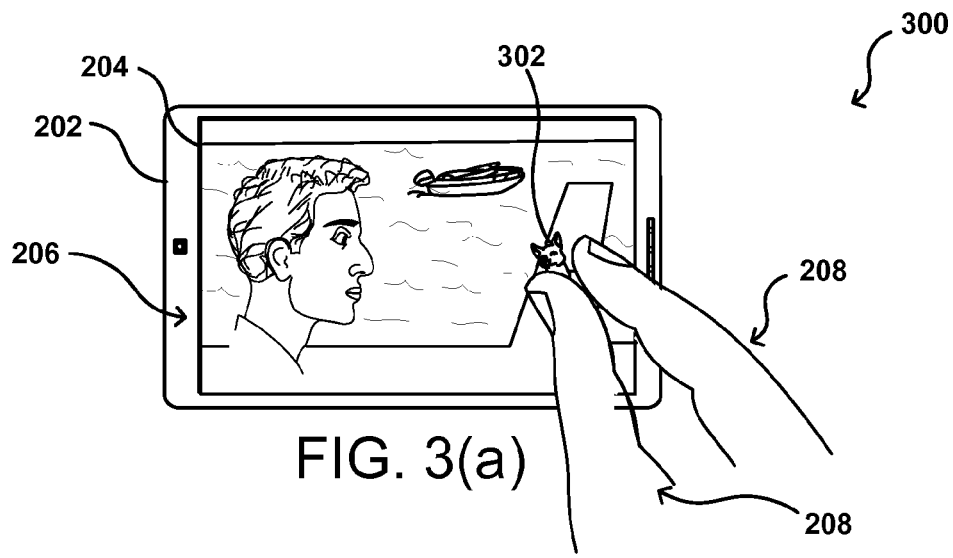
FIGS. 3(a), 3(b), and 3(c) illustrate an example approach enabling a user to select an object in the displayed video, as well as a relative magnification for the object, in accordance with various embodiments.

For example, FIG. 3(a) illustrates an example situation 300 wherein the user from FIG. 2(a) wants to not only adjust the magnification level, but also wants to select a specific object represented in the video. It should be understood that reference numbers for similar elements may be carried over between figures for purposes of explanation, but that such usage should not be interpreted as a limitation on the various embodiments. In this example, the user is interested in obtaining a magnified view of a dog 302 represented in the video content. Further, the user is interested in having the magnified view "follow" the dog when the dog is on the screen, such that the dog remains approximately centered in the displayed video frames and at the specified magnification level, at least when the dog is on the screen.

For example, in FIG. 3(a) the user again places the tips of their fingers 208 together (or at least proximate one another) on or near the touch-sensitive display. In this example, the fingertips are placed near the edges of the representation of the dog 302 in the frame. By indicating the edges of the representation of the dog (or other portion(s) of the dog in other embodiments) the user can indicate or "tag" the dog to be selected as an object of interest. In some embodiments, the user might have to hold their fingers in place for a minimum amount of time, such as at least one second, in order to indicate that an object of interest is being specified. In other embodiments, a user might use three fingers to indicate the selection and magnification setting, where the middle finger can indicate the object and the other fingers can be spread to indicate the desired magnification level. Rather than using their fingers to cause the input, in some embodiments, the user may use a stylus, audible input, head tracking, gaze tracking, gestures, etc.

For example, rather than using a touch-based input, a user may provide an audible input to select an object of interest. As an illustration, a user may say "Select dog" to cause selection of the dog as the object of interest. As another example, one or more image capture devices on the mobile device may determine the user's gaze or areas on the display at which the user is looking. If the user focuses on a particular area of the display, or an object within the video content, for a determined amount of time, the object or area where the user is looking may be selected as the object of interest. In such an example, the user may be asked whether they want to magnify the object of interest and track the movement of the object of interest. In another example, the user may have established preferences to automatically magnify and track an object upon detecting that the user's gaze has been focused on the object for a determined period of time. In still another example, one or more image capture devices on the mobile device may detect a gesture of the user. For example, rather than touching the display, a user may point at an object in the video content. The image(s) of the captured gesture may be processed to determine the position of the gesture with respect to the video content and determine a corresponding object of interest.

In some embodiments, upon selection of an object of interest, an indication, such as a visual, audio, and/or haptic indication, will be provided in order to indicate to the user that the object of interest has been determined. In some embodiments, a graphical representation will indicate the object that the device or software has selected, so that the user can make a different selection if the determination is incorrect. An object of interest may be any object or region within a video that a user desires to track. For example, the object of interest may be an object that moves in the video with respect to other objects, such as representations of humans, dogs, cars, boats, planes, etc. Likewise, the object of interest may be a stationary object or region that moves within the video as a result of the field of view of the video changing.

Once the correct object of interest is determined, in at least some embodiments, the user can make a motion or provide an input to indicate a magnification level and/or presentation size to be used for the object of interest. In a touch-based input example, the user can spread their fingers apart, which can cause the magnification level of the object of interest to adjust, similar to the pinch-to-zoom feature known today. Likewise, if the user moves their fingers together, it may cause the object of interest to decrease in size. As discussed previously, the user can adjust the separation of the fingertips on, or near, the touch-sensitive display in order to adjust the magnification level of the video, such as where the magnification level increases with an increase in separation between the fingertips and decreases with a decrease in separation. Other motions or inputs can be provided as well. For example, one or more cameras may be used to detect a gesture performed by the user to select an object of interest and/or specify a magnification level. In some embodiments, a user can also provide audio commands. Continuing with the audio based selection of the dog, the user may provide an audible command, such as, "Increase magnification level to three" to increase the magnification level of the dog and/or the area of the video content that includes the dog. An audible command may be any command to alter or otherwise change or adjust the magnification level of the object of interest. For example, an audible command may be an increase command (such as the one illustrated above), decrease command (e.g., "Decrease magnification level by two."), and/or other adjustment commands (e.g., "Original size," "increase five x," "zoom in," "zoom out."). In some examples, different input types may be combined. For example, the user may select an object using gaze tracking and then provide an audible command to adjust the magnification of the selected object of interest.

Figure 3B:
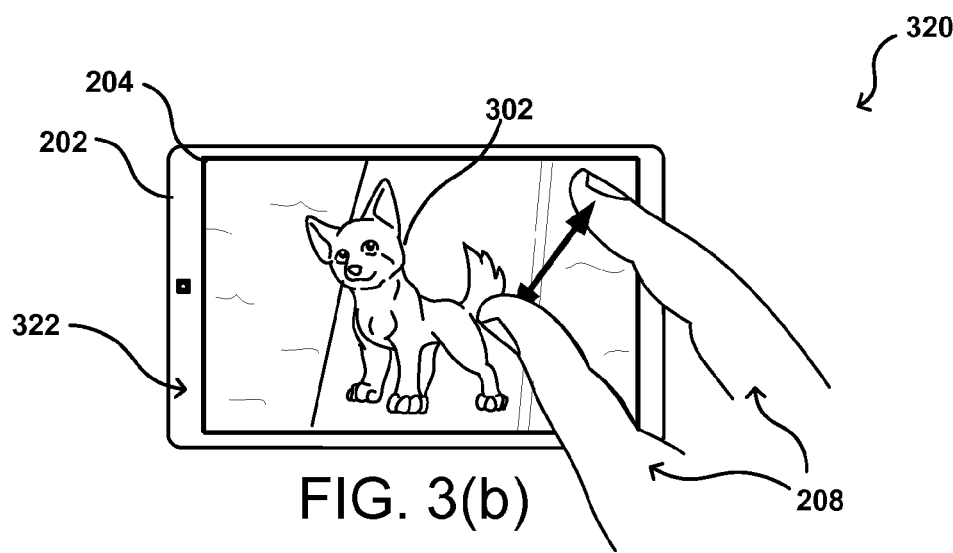

In the example situation 320 of FIG. 3(b) it is illustrated that, in addition to adjusting the magnification level and zooming into the frame of video, the portion 322 of the frame that is displayed is substantially centered on the object of interest, in this case the representation of the dog 302. In some instances where the representation of the object of interest is near the edge of the frame it may not be possible to center the object in the displayed view, but the process can attempt to center the object of interest to the extent possible.

Figure 3C:
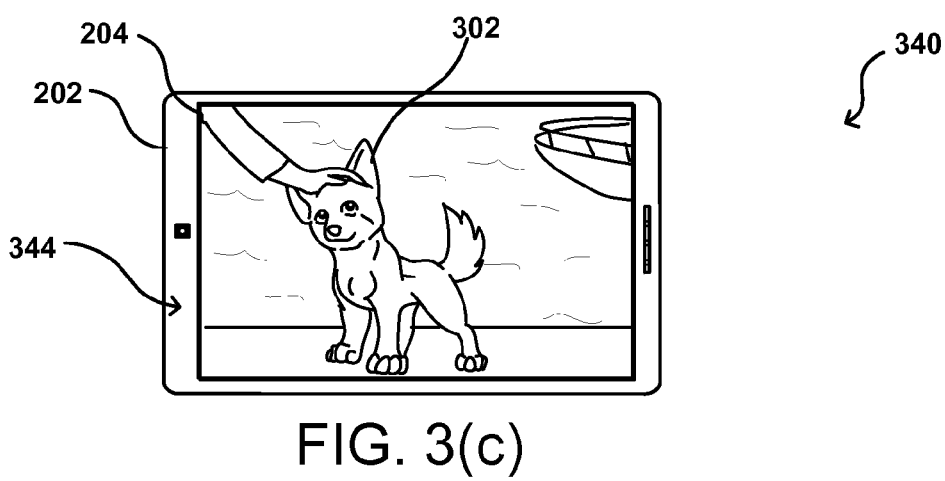

When specifying a magnification level with a selection of a specific object, approaches in accordance with various embodiments can also attempt to determine and maintain a presentation size for the representation of the object of interest. For example, the representation of the dog 302 may move into the foreground or background of the scene in the video, which can cause the size of the representation to vary even when the video is at the desired magnification level. Accordingly, approaches in accordance with various embodiments can attempt to maintain, as closely as possible, a presentation size for the object of interest. For example, in the example situation 340 of FIG. 3(c) the dog has moved towards the man in the foreground of the video, which might cause the representation of the dog to appear larger in the displayed view, and potentially cause the view to display only a center portion of the dog. By determining a presentation size for the dog, however, a view 344 of the video content can be selected when the representation of the dog is visible such that the size of the dog on the screen remains relatively constant as the dog moves from the background to the foreground. In FIG. 3(c), the representation of the dog in the displayed video portion remains substantially the same size as in the selection view of FIG. 3(b), and is also relatively centered, even though the dog 302 has moved from the background to the foreground. In this example, the center of the dog is displayed somewhat below the center of the displayed view since the representation of the dog is relatively close to the bottom of the actual video frame, such that only a certain amount of centering is possible at the current magnification level. As the dog moves further into the view of the video, the dog will be centered in the displayed view.

In some embodiments, there can be limits on the amount to which the magnification level can be adjusted in order to keep the object of interest at a substantially constant presentation size. For example, the video content cannot have a magnification level less than zero (or one) in some embodiments, as the view cannot zoom out to show more content than is available in the provided video (or otherwise available). In some embodiments, a user may specify a preference to allow bars or blank space to be displayed around the perimeter of the presented video if the presentation size is to be strictly enforced. Further, a magnification level might not be allowed to go beyond a certain level, which might be based upon factors such as the size of the representation in the frame and the resolution of the video content. For example, a 4K video might only be able to be magnified 20X before the lack of resolution, even with filtering or interpolation, provides a poor quality image. Thus, the size of the object of interest might not be able to keep constant if maintaining the size would cause the magnification to cross this quality threshold level. Further, in the situation where the magnification is being determined and adjusted dynamically, in substantially real time, there might be limits on the rate at which the magnification can change, such that rapid movements of the object between the foreground and background do not result in rapid changes in magnification of the frame, which can lead to a potentially unenjoyable user experience. Various other limitations can be applied as well in various embodiments.

Figure 4A:
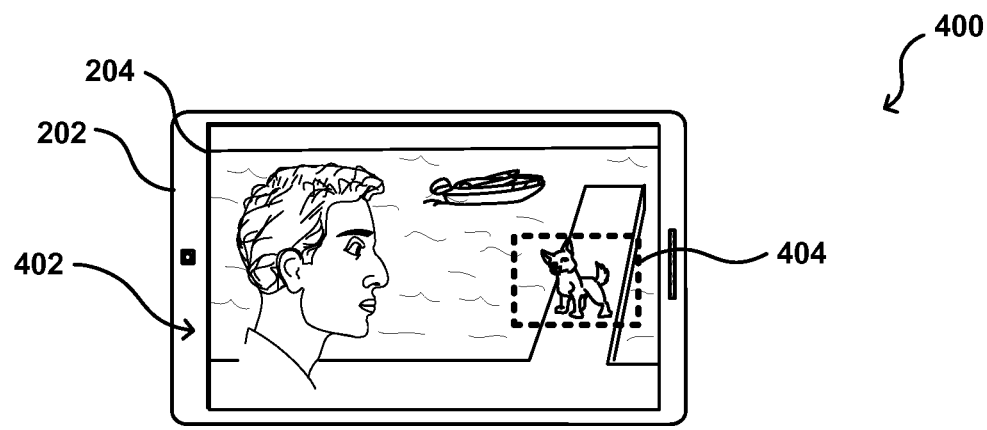
FIGS. 4(a) and 4(b) illustrate an example of magnification and region updating as a representation of a selected object moves in the video content, which can be utilized in accordance with various embodiments.
Figure 4B:
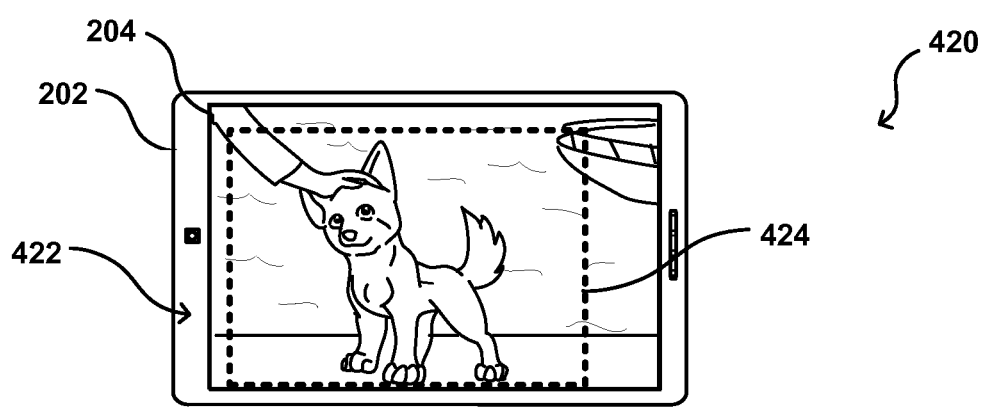

FIGS. 4(a) and 4(b) illustrate the portions of two frames of video that can be selected based upon a selected object of interest and a determined presentation size. In the example situation 400 of FIG. 4(a), a portion 404 of the frame 402 of video can be selected for display that has the object of interest (the dog) centered and at approximately the determined presentation size. As the representation of the object moves between frames, the selected portion of each frame can adjust accordingly. For example, in the example situation 420 of FIG. 4(b) the representation of the dog takes up almost the entire frame 422. A portion 424 of the frame is selected that keeps the representation of the dog as close to centered as possible, while attempting to maintain the presentation size to the extent possible. Thus, the magnification level and location of the selected portion can adjust with changes in the representation of the object in the video content. As mentioned elsewhere herein, the magnification or selected portion cannot go beyond the amount of video content provided, and there might be limits on the magnification level, such that in some cases magnification may not be applied or an object may not be centered based at least in part upon the limitations of the video content itself.

In at least some embodiments, an active tracking process can be used for an object of interest. In one embodiment, a user selecting two points on the display can cause that frame of video to be analyzed using at least one object recognition process, such as an object identification process or computer vision process, among others, to attempt to identify a representation of an object that has edges or other features proximate to the selected points. In some embodiments, the process can take a portion of the frame of video corresponding to the points and utilize an image matching process to attempt to match the portion against a library of images in order to identify the object of interest. In other embodiments, the process instead attempts to determine identifying features that enable the object to be tracked between frames. For each frame, the process can attempt to locate the object of interest, in many cases using the previous position as a starting point.

One example of an image tracking algorithm that can be used with video content is a tracking learning detection (TLD) algorithm, which combines aspects of image tracking and machine learning. The algorithm can function as a machine-learned patch detector, such that when a user indicates a region of a video frame, the algorithm can analyze the selected region and train a classifier and/or model for this region versus every other patch in the image. The tracker can be updated over time as variations occur in subsequent frames. If the object of interest is lost, such as when the object goes off screen, there is an occlusion, or there is a shot change, the updating of the model can be paused until the object can be detected in a subsequent video frame with at least a minimum amount of certainty. Once detected, the model can be updated and tracking can continue. The process can retain information about previous instances of that object, at least for a period of time, in order to assist with the tracking.

As mentioned, in many cases the appearance of the object will change, whether the object rotates, bends, adjusts, changes expression, changes outfits, or otherwise deforms in appearance versus an earlier appearance. In some embodiments, a particle tracking process can be used to track multiple points or portions of an object as that object moves or deforms. Such a process can track the changes and add or remove points as the representation of the object changes. As long as, at least a minimum number of points are detected within a threshold distance and/or within a threshold amount of variation from their previous relative orientations, the object can be determined to still be tracked with acceptable certainty. Particle tracking can be more robust than fixed tracking in at least some embodiments. Further, in cases where subsequent video frames are available for analysis, a look-ahead process can be used to locate the object in subsequent frames and work backwards to increase the confidence that the currently tracked location of the object is accurate. This can be useful in cases where, for example, someone walks in front of a person or the person's hair blows in front of his or her face for a short period of time, as working from both directions can increase the confidence that the object is in the determined position. As still another example, video codec bit stream motion vectors may be analyzed and compared to determine and track an object of interest between frames. In some implementations, using one or more of the techniques discussed above, a vector field of each frame may be generated. Vector fields of different frames may be compared to identify the object of interest within each frame. Other algorithms that may be used include, for example, edge detection algorithms, object recognition algorithms, facial recognition algorithms, pa predator tracking algorithm and/or a motion detection algorithm.

Figure 5:
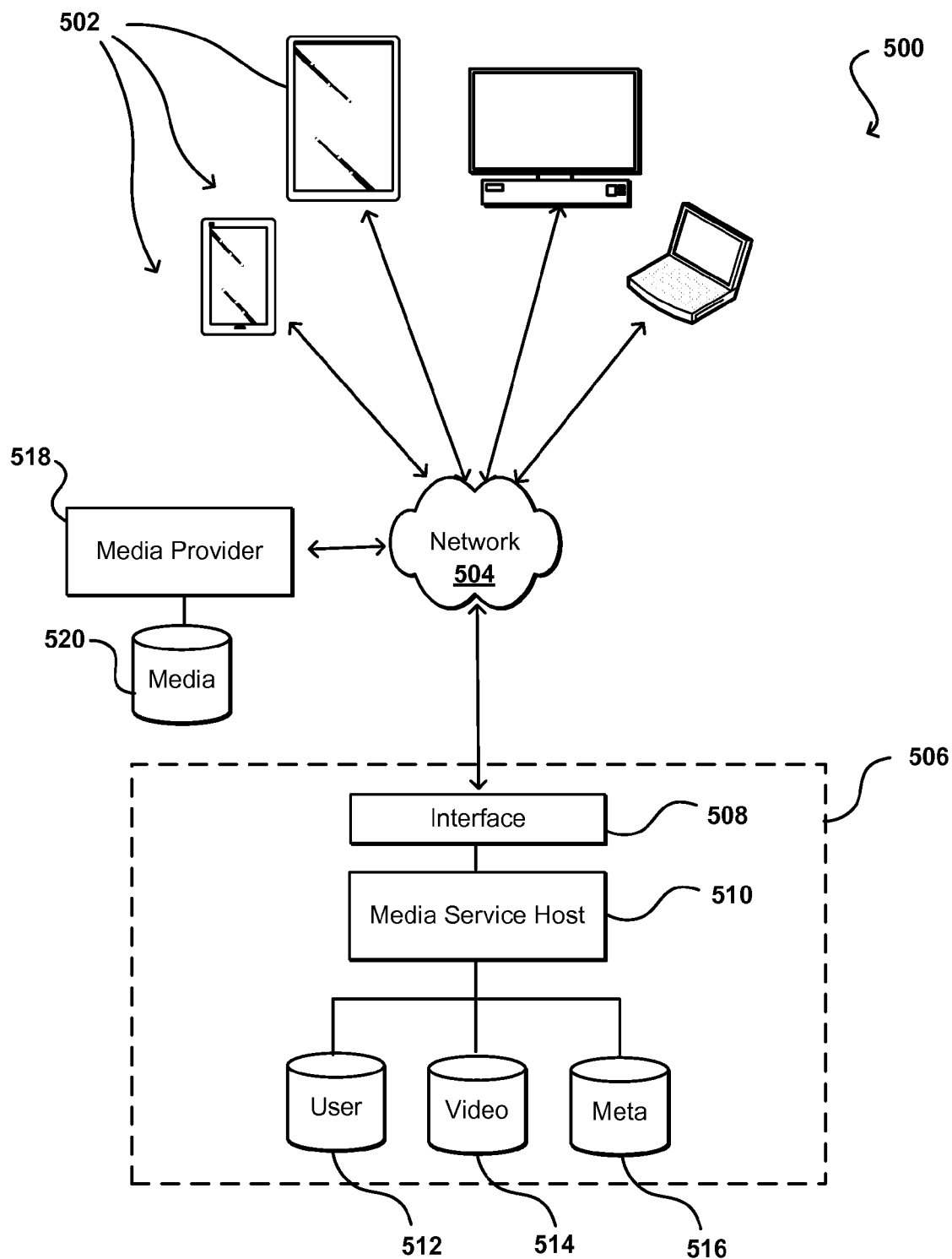
FIG. 5 illustrates an example environment in which portions of the various embodiments can be implemented.

FIG. 5 illustrates an example environment 500 in which aspects of various embodiments can be implemented. In this example, users are able to utilize various types of electronic devices 502 to request delivery of content over at least one network 504, such as the Internet, a cellular network, a local area network, and the like. As known for such purposes, a user can utilize a client device to request video content, and in response the video content can be downloaded, streamed, or otherwise transferred to the device. In this example, the users can have an account with a media service provider associated with a media service provider environment 506. In some embodiments, the user can subscribe to the media service provider in order to obtain the rights to access various instances of video content. At least some embodiments operate using a client pull model, wherein a client device asks for information about what is available for download, and the client determines which content to download and requests that information. In some embodiments, each two second segment of video may have has its own URL or other address or indicator, such that the client sends a new request every two seconds if the video content is to continue to be displayed. As discussed later herein, such an option enables the client device to request only those tiles, slices, or streams as are appropriate for changes in magnification or other such aspects, and minimizes the amount of bandwidth, memory, and processing capacity needed for portions of the video content that are not actually displayed on the device.

A request for content can be received to an interface layer 508 of the service provider environment 506, which can include components such as APIs, Web servers, network routers, and the like. The components can cause information for the request to be directed to a media service host 510, or other such component, which can analyze information for the request to determine whether to grant access to the video content identified in the request. In some embodiments, this can include validating a user credential to verify that the user has a current account that enables access to the requested content in the manner requested. This can involve, for example, comparing the credential against information stored for the user in a user data store 512 or other such location. If the user has such an account, the user can be provided with access to the content, which can include initiating a transfer of the content to the appropriate user device in at least some embodiments. In some cases, the media service provider can provide the content directly, such as from a video data store 514 of the provider environment 506. In other cases the service provider might send a request to a media provider 518, which might be a producer of the content or another such entity, system, or service, which can cause the media to be transferred from a respective media repository 520. Various other approaches to enabling video content to be provided for display on various client devices can be utilized as well in accordance with various embodiments. In at least some embodiments, the media service host 510 can also determine which version of the content to provide, as different versions can be appropriate for different types of devices based on factors such as operating system, media player type, display resolution, connection bandwidth, type of user or subscription, and the like.

In some embodiments, an offline process can be used to identify potential objects of interest in video content. This can be performed by the media provider 518, the media service provider, or another appropriate entity. Potential objects of interest can be identified by these entities, or in some embodiments by monitoring the objects selected by users as potentially being of interest, in order to crowd source the object selections. In some embodiments, each scene of video content that contains a representation of the object of interest can be determined and an appropriate magnification level and portion of the video selected in order to attempt to maintain the object substantially centered and at the approximate determined presentation size. While this process can be performed automatically in some embodiments, in other embodiments at least one user can have the ability to adjust the magnification and portion selections for each frame in order to provide artistic or aesthetically pleasing results that capture the initial intent while making the user experience more enjoyable. In other embodiments, the tracking and determinations for an object of interest that are determined for a user can be stored and reused when other users select the same object of interest in the same video content, in order to reduce processing requirements. In this example, the tracking data can be stored in a location such as a metadata repository 516, which can be transferred with the video content in order to allow the selected portion(s) of the video to be displayed on the appropriate user device. As discussed later, the metadata can also be used to indicate to a user which objects have magnification information available for selection by a user.

Figure 6:
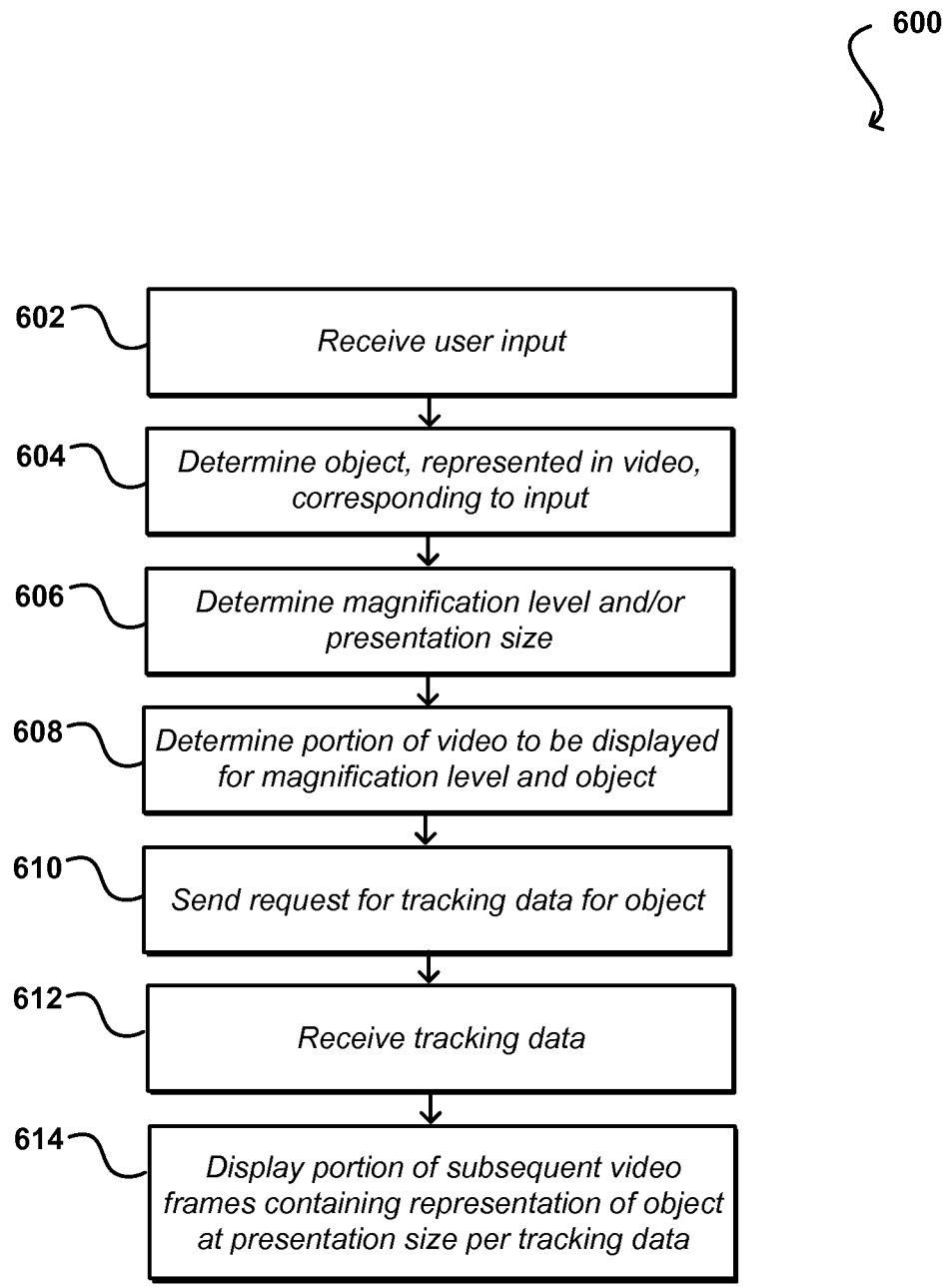
FIG. 6 illustrates an example process for displaying a pre-determined portion of video content corresponding to a selected object that can be utilized in accordance with various embodiments.

FIG. 6 illustrates an example process 600 for determining a portion of video content to display based upon a selected object of interest that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, user input is received 602 that indicates one or more points in a video frame. As discussed, this can include detecting touch inputs at two locations of a touch-sensitive display and determining the corresponding locations in video content being presented via the display. Based at least in part upon the user input, an object of interest, represented in the video, can be determined 604. In situations where the user input also provides information about a change in zoom level with respect to the object of interest, at least one of a magnification level or a presentation size can be determined 606 as well, such that the size of the portion of video to be displayed for the object of interest can be determined. The portion of the video to be displayed for the magnification level and object corresponding to the input can be determined 608, such that the current video frame(s) to be displayed can be displayed with the appropriate magnification level centered about the object of interest. In addition, a request for tracking data corresponding to the object of interest can be sent 610, such that if tracking information exists for that object in the video content then the tracking device can be used to determine the portion of the video to display without having to make a dynamic determination on the client device, thus conserving resources on the client device and potentially improving the user experience. In this example, the tracking data for the object exists, such that the tracking data can be received 612 to the client device. The portion of the subsequent video frames that include a representation of the object of interest can then be displayed 614 with the object of interest approximately centered in the portion with the appropriate presentation size, to the extent possible and/or practical as discussed elsewhere herein. The tracking data in some embodiments includes the position of the object, or the appropriate position of the center of the appropriate portion to be displayed, such that the portion can be displayed at the appropriate magnification level. In other embodiments, the tracking data can also include the appropriate magnification level for the desired presentation size, where one or more presentation sizes might be selectable by the user. Various other such information can be provided and/or utilized as well. If the user makes adjustments to the display, that information can be used to attempt to improve or update the tracking information stored for the object, such as where a user adjusts a magnification level for a particular scene.

In some embodiments video content can be analyzed to identify commonly selected objects such as people and faces. This can be done using a generic people and/or object detection algorithm, for example, or by analyzing data from users having viewed the particular video content. For each determined object, or at least a selection of these objects that appears at least a minimum amount of time in the video content, relatively "lightweight" tracking information (such as a general location point and magnification level for each appropriate scene) can be provided with the video content, or made available to the user for separate download or purchase. In some embodiments, a user can subscribe to a service that provides such tracking data. A user might select an option to obtain tracking data for any video content that includes the user's favorite actor, for example, and can have this data provided automatically any time the user downloads, streams, or otherwise obtains video content including that actor. If tracking data is not available for content including the actor, a dynamic approach can be taken as discussed herein. In some embodiments, users can specify several different actors with a presentation size for each. In some embodiments, a user can designate settings for faces, people, and other types of objects when content is displayed on a specific device, and can apply other settings for those objects in content displayed on a different device, which may have different sizes and/or capabilities. The use of pre-generated tracking data can help to reduce the processor load on the user device, and can be bit stream agnostic, for example, such that the data would not change with variations in bitrate or encoded resolution. Pre-generated tracking data can also allow for deeper analysis, which can provide better tracking of objects across edits or shots. Such data will generally not be able to support arbitrary objects, however.

Figure 7:
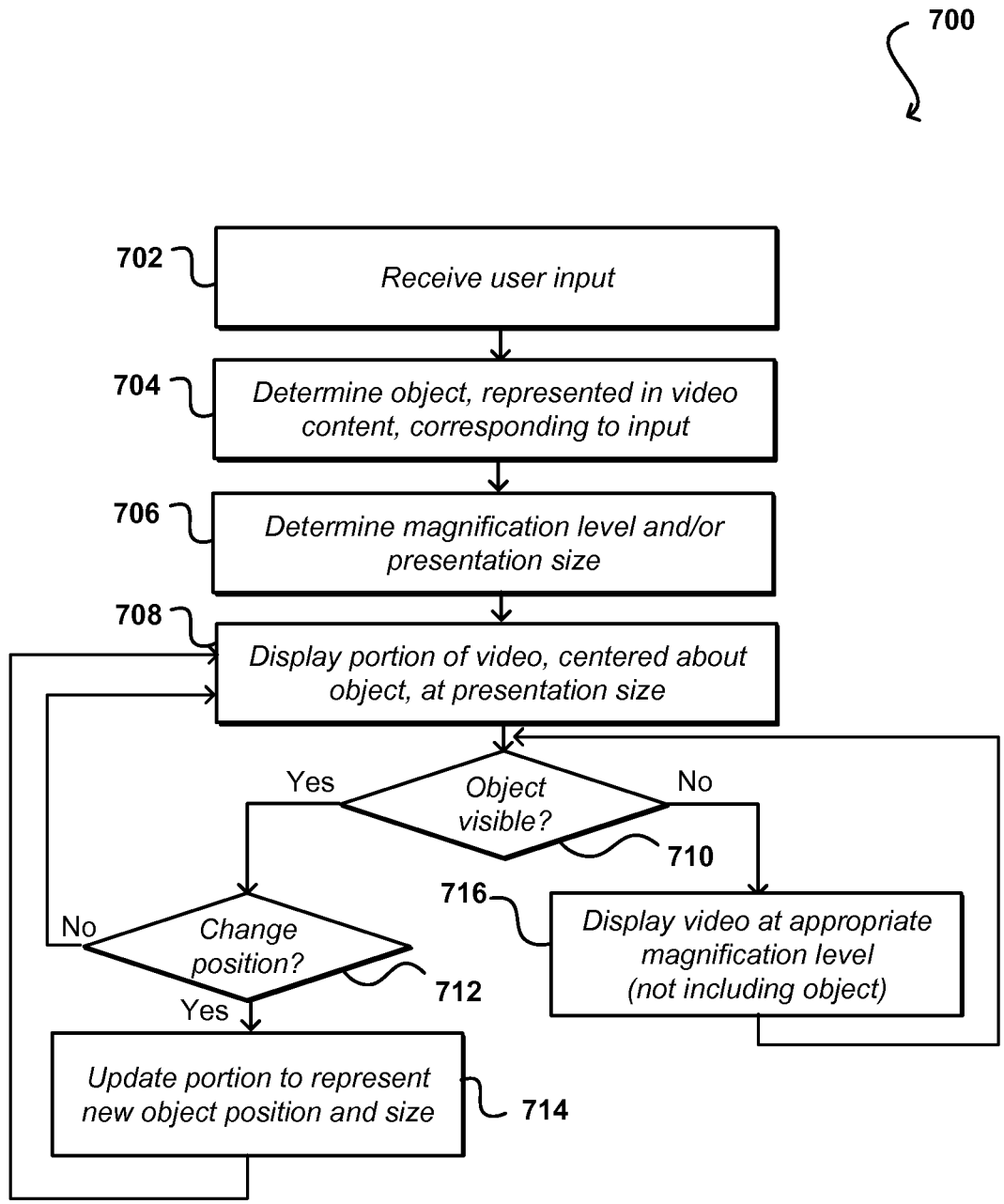
FIG. 7 illustrates an example process for determining a magnification and portion of a video frame to display in response to a user's selection of an object that can be utilized in accordance with various embodiments.

FIG. 7 illustrates another example process 700 for determining a portion of video content to display based upon a selected object of interest that can be utilized in accordance with various embodiments. In this example, tracking information is unavailable for a selected object of interest, such that the determination and presentation of appropriate portions of video content must be made in near real time. As with the previously discussed process, user input is received 702 that indicates an object of interest in displayed video. The object represented in the video and corresponding to the input is determined 704, such as by using one of the approaches discussed previously. The magnification level and/or presentation size are also determined 706 based at least in part upon the user input. The portion of the video content that is centered about the object of interest and displays the object of interest at the determined presentation size is then displayed 708. As mentioned, in this example, tracking information is not available for the object of interest in this video content. Accordingly, determinations of the portions of upcoming video frames to be displayed are determined dynamically in near real time. For a given frame of video, a determination can be made 710 as to whether a representation of the object of interest is visible in the frame. As discussed, this can involve using one or more image matching algorithms or another such object recognition process. In some examples, the object of interest may be in one frame and not in the next frame. For example, a scene change may result in the object no longer being in the frame. If the object is not represented in the frame, then an appropriate magnification level can be used to display 716 that video frame. In many cases, the video frame will be displayed at the standard or default magnification level unless another object of interest is represented in the video frame.

If a representation of the object is visible in the frame, a determination can be made 712 as to whether there has been an actionable change in the position of the representation in the video. An "actionable" change can be an amount of relative movement in any direction that causes the location or apparent size of the object in the video to change by more than a threshold amount, such that a new portion of the video content should be selected to maintain a presentation size or center about the object of interest. In at least some embodiments, the change must be more than a threshold amount (e.g., affect more than a couple pixel widths in any direction) before the portion is updated, in order to minimize "jerkiness" or small, rapid movements in the location of the portion, in order to smooth the transitions and improve the overall viewing experience. Various other filtering or smoothing processes can be used as well to minimize jarring motions or changes during shot transitions or other such events. For example, low pass filtering, kalman filtering and/or other smoothing techniques may be utilized.

If no actionable change is detected, the current view and magnification level can be maintained for that frame of video content. If an actionable change is detected, the portion of the video content to be displayed can be updated 714 in order to represent the new location and/or apparent size of the object, in order to attempt to maintain the desired centering of the object and presentation size. As mentioned, other settings can be specified by a user, provider, or other such entity which can affect the portion selections, and multiple selections can be provided for the same video content in at least some embodiments. Performing real-time tracking on a client device will generally require additional CPU load, but can allow for flexible selection of arbitrary objects. As discussed above, an object of interest may not be present in one or more frames (e.g., due to scene change) but may then be present in later frames (e.g., due to another scene change). In such an example, the example process may automatically return to a determined magnification level and/or presentation size 706, and continue. In some embodiments, there may be a threshold amount of time after which the example process 700 will not automatically return to magnifying and centering the object of interest. For example, if an object of interest is identified by a user, presented utilizing the example process 700, no longer detected in the video content and then is detected within a later frame of the video content within the threshold time (e.g. 15 seconds), the example process will automatically resume with respect to the object of interest. However, if the object of interest is not detected until after the threshold time, the example process may not resume with respect to the object of interest without user input.

Figure 8:
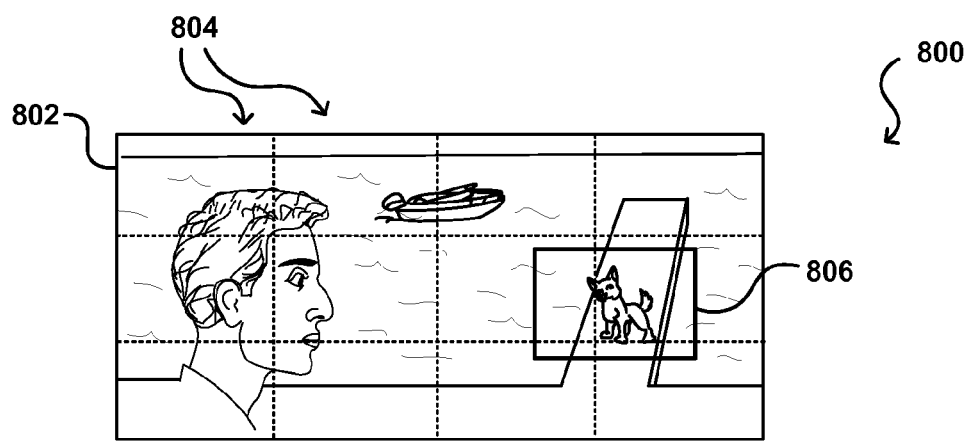
FIG. 8 illustrates an example approach for selecting video tiles to stream to a computing device that can be used in accordance with various embodiments.

FIG. 8 illustrates an example approach 800 that can be used to reduce resource requirements for presenting video content in accordance with various embodiments. In this example, the video content 802 is comprised of a set of video tiles 804. These tiles each represent a portion of the video content, where the tiles are organized spatially. Such an approach enables the tiles to be delivered separately and/or through different channels, in order to increase throughput where multiple channels or connections are available. As mentioned, in some embodiments a selection from a user will cause a certain portion 806 of the video content to be displayed. As illustrated, this portion can be a small portion of the overall video content, which for streaming content can require much more bandwidth to transfer the entire video content, and memory to store the video content, than is actually needed for the portion 806 that is to be displayed. Accordingly, approaches in accordance with various embodiments can attempt to determine which of the tiles 804 are needed for the portion 806 of the video that is to be displayed. Such a determination enables only those tiles to be transferred to the device, or loaded into memory, in order to display the appropriate portion 806. As the portion 806 or view to be displayed changes, the selection of tiles 804 may change accordingly. In some embodiments, only those tiles that are at least partially included in the portion 806 to be displayed will be transferred to the device. In other embodiments, adjacent or surrounding tiles might be transferred as well, such that the necessary video content is available in case the location and/or position of the portion changes rapidly, in order to prevent short periods where less than all the video information for the portion has been transferred for display.

In addition to tiling, another approach that can be utilized to conserve bandwidth and other resources relates to scalable video coding. Instead of streaming video switching between independent bit rates, a number of layers can be established. For example, there might be a 300 kb stream at a low resolution, and a 600 kb version functions as an enhancement, rather than a replacement, to the lower resolution stream. Each previous layer can similarly be increased as bitrates go higher. Such an approach enables a client device to only request as many layers as are appropriate for the device and/or settings. For a mobile device at a typical magnification level, such as zoomed all the way out, the minimum bit stream alone might be acceptable. If the user adjusts the magnification level, such that higher resolution (e.g., 4K resolution) is appropriate, one or more additive streams can be obtained to achieve the increased detail. If used with a tile approach, the additive streams can be requested for only those tiles that are currently being displayed at the magnified view. In some embodiments, a video stream might be the culmination of three different streams, including a base 300 kb stream as well as additive streams of 600 kb and 1200 kb. The media player application on the client device can include a decoder that is then able to combine the streams to generate the final video frames. In some embodiments, a client device might download the lowest appropriate bit stream for all tiles, and download the higher resolution tiles for the zoomed in view, in case a rapid change requires information from the other tiles.

Figure 9:
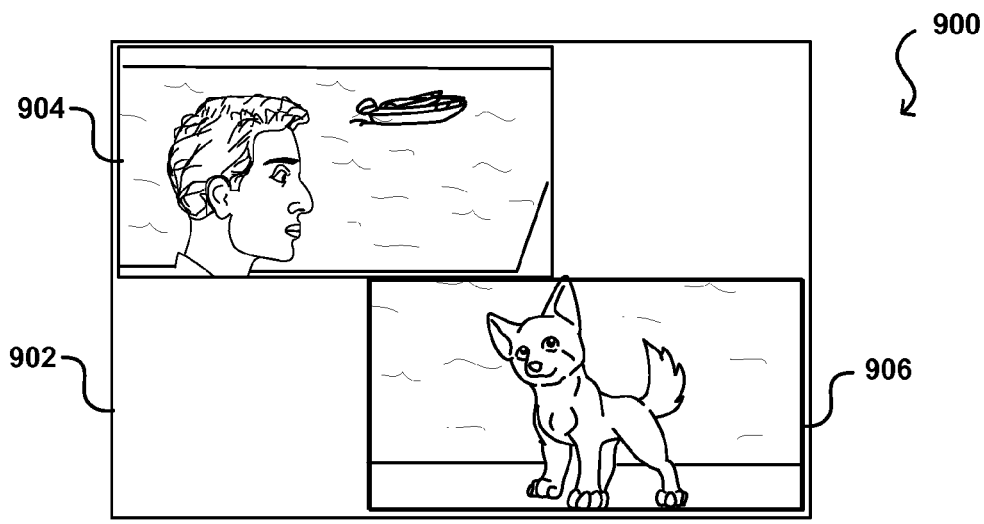
FIG. 9 illustrates an example approach for concurrently displaying different portions of video content that can be used in accordance with various embodiments.

In some embodiments, two or more portions of the video content can be displayed concurrently according to at least one user selection of an object of interest. For example, FIG. 9 illustrates an example situation 900 wherein the user has selected an object of interest, in this case the dog, which can cause a view and/or portion 906 of the content corresponding to the view to be displayed that includes the representation of the dog. While the dog is represented in the video, this view can be updated along with the video content. When the shot changes to a shot that does not include the dog, the last frame of video can be displayed for the portion 906 including the representation of the object of interest, while the current frames of the video are being displayed in another view or portion 904 of the video content displayed in the display area 902. Such an approach enables the user to always have a view of the object of interest, including the current or last view of the object, while still being able to view other scenes or shots in a different region of the display. In some embodiments, multiple objects can be selected with different presentation sizes, and with each of these being represented in a different region of the display. In some embodiments, instead of showing the last frame of video including the representation, other content relating to the object of interest can be displayed which may include still images, text or description data, products relating to that object, and the like.

Figure 10:
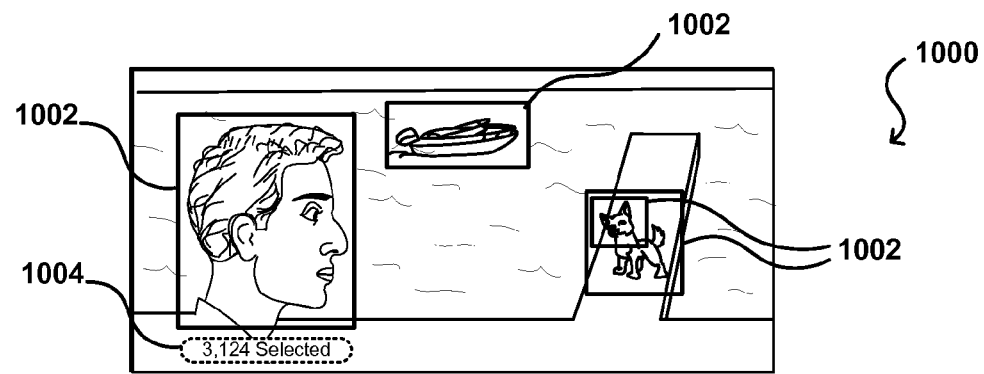
FIG. 10 illustrates an example approach for indicating objects that have previously been selected in video content that can be used in accordance with various embodiments.

FIG. 10 illustrates an example situation 1000 wherein tracking data exists for multiple objects represented in the video content, or at least where objects have been identified that the user might be interested in viewing at a higher magnification level, etc. In this example, there are four bounding boxes 1002 indicating objects that have been selected by a user or provider, or that have been identified using an algorithm or process, as being potentially of interest to be tracked for the user. For example, a bounding box may be created for an object that is frequently selected by users as an object of interest. As another example, a producer, author, etc., may identify objects for which a bounding box is established.

Bounding boxes effectively segment the video content into segments that include objects of interest and segments of the video content that do not include objects of interest. In some embodiments, supplemental information may be presented in one more segments of video content that does not include an object of interest. For example, the segment of video content below bounding box 1002 that includes the persons head may be used to present supplemental information 1004 as to how many other users have selected that object of interest. In other embodiments, other information may be presented in segments of the video content that do not include objects of interest. For example, supplemental information may include information about the object of interest (e.g., actor's name, age, history of the object of interest, location of the object of interest, information about the video content). In some embodiments, a user may select and interact with supplemental information. For example, if the supplemental information 1004 includes information about an actor, a user may select the supplemental information to obtain additional information about the actor.

Returning to FIG. 10, one of the boxes includes the entire representation of the dog while another includes only the representation of the head of the dog, which can provide two different views and magnification levels for essentially the same object, although in one case the object might be considered to be the head instead of the entire animal. This distinction can be particularly useful for human actors where the user wants to be able to see the facial expressions of the actor and may not care as much about the body language, or vice versa. In some embodiments, a user can select any of these bounding boxes 1002 in order to have an optimized view of the content displayed that focuses on the object corresponding to the box.

In other embodiments, the user can select the bounding box using two fingers and then adjust the separation of the fingers to set a presentation size. Various other options can be utilized with the bounding boxes as well, and indicia other than bounding boxes can be used to indicate selectable items in various embodiments.

Figure 11A:
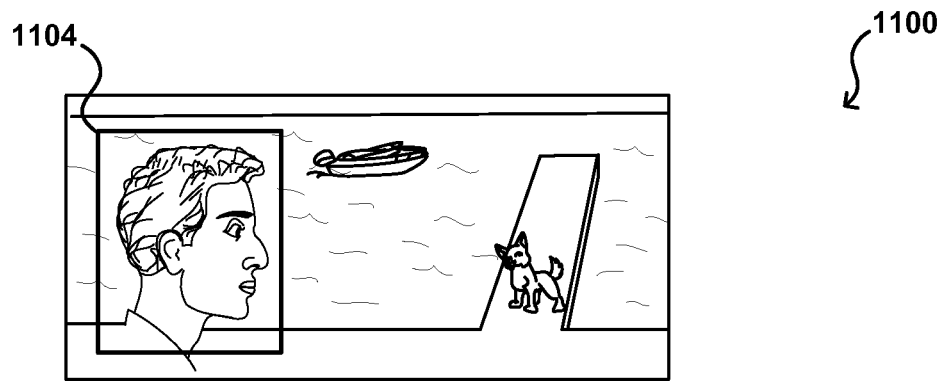
FIGS. 11(a), 11(b), and 11(c) illustrate an example approach to tracking the movement of a deformable representation in video content that can be used in accordance with various embodiments.
Figure 11B:
Figure 11C:
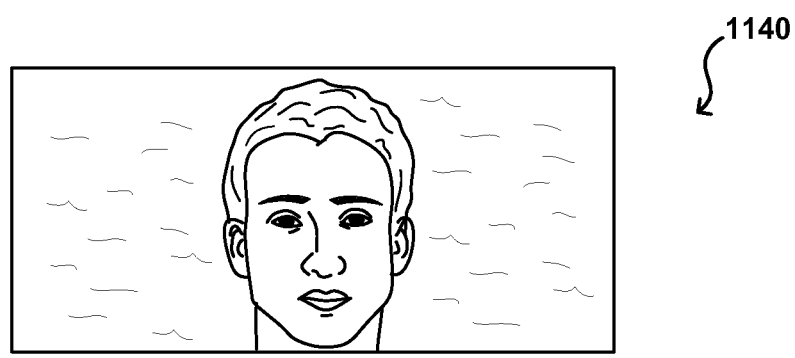

As mentioned previously, algorithms such as particle tracking algorithms can be used to track representations of those objects even as the displayed views of those objects change. For example, in the situation 1100 of FIG. 11(*a*) a user can select a representation 1104 of an actor's head as the focus for the smart zoom. Using conventional image tracking that relies upon the image not changing significantly, the head can be tracked as long as the representation stays the same, such as is illustrated in the example situation 1120 of FIG. 11(*b*). In this example the view of the actor has not substantially changed from FIG. 11(*a*), such that conventional image tracking can be used. It will often be the case, however, where the representation of an object of interest can change significantly between frames of video content. For example, the view 1140 provided in FIG. 11(*c*)

illustrates the user with a front-facing view, rather than a side view. A conventional image tracking algorithm can have difficulty as the relationship between image features in the two displayed views will be significantly different. If an approach such as particle tracking is used; however, differences that occur over time can be tracked, as the frame-to-frame differences will often be small enough that the object can still be tracked with adequate confidence. Further, different particle relationships can be stored, or a model updated, for example, such that if a subsequent shot is displayed that shows the front view of FIG. 11(c) after a shot change from the view of FIG. 11(b), the algorithm can still determine with adequate certainty that the object represented in the shot is the object of interest indicated by the user. Various other algorithms and approaches for tracking deformable objects in video content can be used as well within the scope of the various embodiments.

In some embodiments, objects can be selected during playback of the video content. In other embodiments, selection can be performed while the video content is paused, or running in slow motion, in order to enable a more precise object selection to be performed. If selection is made during playback, the selection of edges or setting of presentation size can be difficult if the object is moving. Pausing the video content when the user attempts to make a selection can make the selection easier and result in fewer false positives or adjustments needed to be made on the part of the user. If the object is only on the screen for a short period of time, the playback for the rest of the scene might then be played in slow motion. For example, an actor or object might only be on the screen for a short period of time, and the user might zoom in to get a better view. In order to provide the improved view, a slow motion view can be provided in addition to the magnification. In some embodiments, the user can specify the slow motion, while in others the motion might be initiated automatically through a look-ahead process that determines that the object is only on screen for a limited time or number of frames, among other such options.

In some embodiments, users can also be able to share their settings and/or tracking data with others. For example, a user might be presented with a share option that enables the user to share the data with others via email, messaging, social networking, and the like. In some embodiments, the user might have an account that automatically posts to a profile any tracking data that the user has generated. In some embodiments, information about the selected objects and presentation size settings can be collected, with permission of the user or at least with the ability of the user to opt out of data collection, for use in improving the pre-generated object tracking and identification process. As mentioned, this information can also be used to determine the objects for which to provide pre-generated tracking information, which in at least some embodiments can be based upon the tracking information generated for these or other users. In some embodiments, users can vote on specific paths or selections in order to have the most desirable versions available for download with specific content.

In some embodiments, a user of a device such as a mobile phone may be able to select a specific viewing mode to be applied to video or other media content. For example, the user might select a close-up mode that causes faces to be magnified in dialog scenes, such that the user can view the facial expressions during scenes of conversation and the like. Similar modes and approaches can be used for other media as well, such as flash media, video games, and the like. For media such as video games, it is possible to re-render the higher magnification image at a higher resolution, using a different texture map, etc. In some embodiments, a device can attempt to zoom in on objects at which the user is gazing, although rapid eye movements can cause the displayed portion to change rapidly as well, which may provide for a poor user experience. Monitoring which objects users tend to view can be used; however, to select objects that might be of interest for tracking purposes.

Figure 12A:
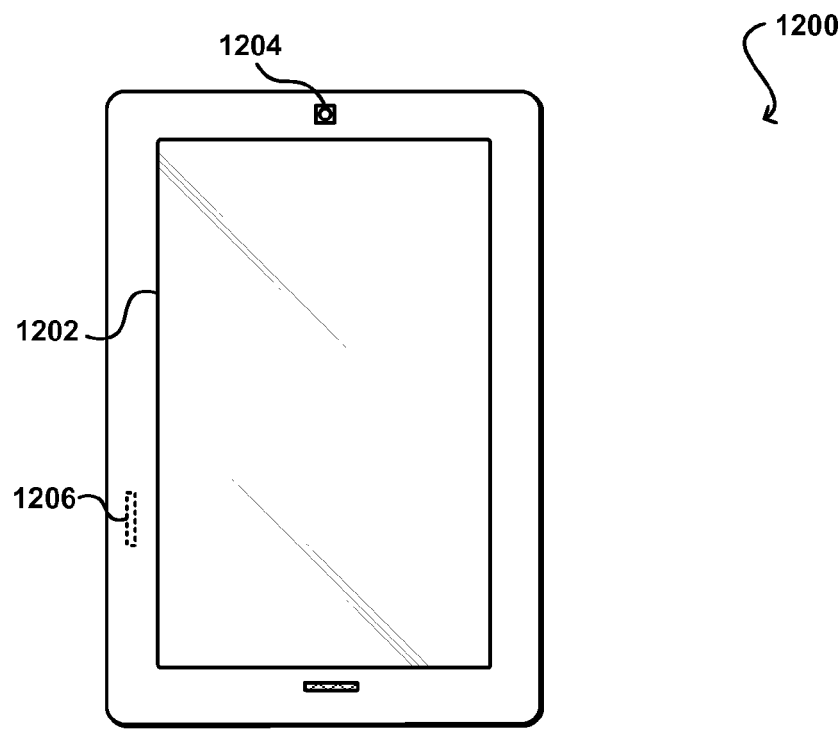
FIGS. 12(a) and 12(b) illustrate an example computing device that can be used in accordance with various embodiments.

FIG. 12(a) illustrates an example computing device 1200 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

In this example, the computing device 1200 has a display screen 1202, which under normal operation will display information to a user (or viewer) facing the display screen (e.g., on the same side of the computing device as the display screen). The computing device in this example can include one or more image capture elements, including an image capture element 1204 on the front of the device. It should be understood that additional or fewer image capture elements could be used, and could also, or alternatively, be placed on the sides, corners, or other locations on the device. The image capture elements may also be of similar or different types. Each image capture element may be, for example, a camera, a charge-coupled device (CCD), a motion detection sensor or an infrared sensor, or can utilize other image capturing technology. The computing device can also include at least one microphone or other audio capture element capable of capturing audio data. As discussed herein, the device can include one or more motion and/or orientation-determining elements, such as an electronic compass and/or an electronic gyroscope, as well as an accelerometer, inertial sensor, global positioning sensor, proximity sensor, and the like, which can assist with movement and/or orientation determinations. The computing device can also include at least one networking component 1206, such as a cellular, Internet, or Wi-Fi communication component, enabling requests to be sent and video content to be received to the device, among other such communications.

Figure 12B:
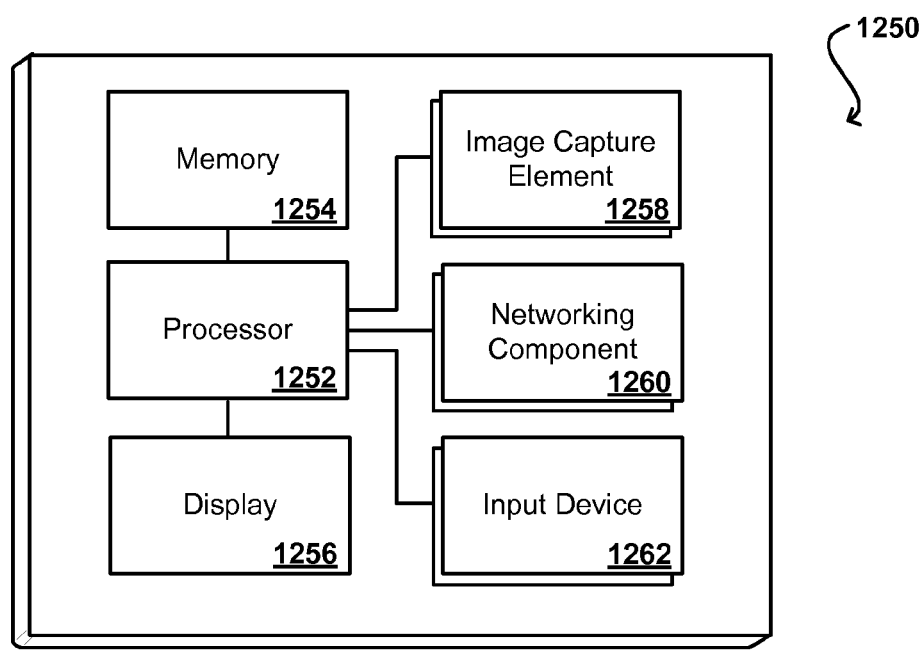

FIG. 12(b) illustrates a set of basic components of a computing device 1250 such as the device 1200 described with respect to FIG. 12(a). In this example, the device includes at least one processor 1252 for executing instructions that can be stored in a memory device or element 1254. As would be apparent to one of ordinary skill in the art, the device can include many types of memory, data storage or computer-readable media, such as a first data storage for program instructions for execution by the at least one processor 1252, the same or separate storage can be used for images or data, a removable memory can be available for sharing information with other devices, and any number of communication approaches can be available for sharing with other devices. The device typically will include at least one type of display element 1256, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 1258, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc. The device can include at least one networking component 1260 as well, and may include one or more components enabling communication across at least one network, such as a cellular network, Internet, intranet, extranet, local area network, Wi-Fi, and the like.

The device can include at least one motion and/or orientation determining element, such as an accelerometer, digital compass, electronic gyroscope, or inertial sensor, which can assist in determining movement or other changes in orientation of the device. The device can include at least one additional input device 1262 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices will also typically include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and other non-transitory media, such as, but not limited to, volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   at least one processor;
   a touch-sensitive display;
   memory including instructions that, when executed by the at least one processor, cause the computing system to:
      display a first frame of a video on the touch-sensitive display;
      receive a user input selecting a portion of the first frame of the video that includes a representation of an object, wherein the selected portion is less than the displayed first frame of the video;
      receive a user input identifying a presentation size for the representation of the object, the presentation size corresponding to a magnification level of the displayed first frame of the video;
      display the representation of the object at the identified presentation size;
      determine a size of the representation of the object in a second frame of the video;
      if the determined size of the representation of the object included in the second frame is different than the identified presentation size of the representation of the object, alter the magnification level of a displayed portion of the second frame that includes the representation of the object; and
      display at least a portion of the second frame including the representation of the object at the altered magnification level so that the representation of the object is displayed at the presentation size.

2. The computing system of claim 1, wherein the instructions when executed further cause the computing system to:
   determine a position of the representation of the object in the second frame of the video; and
   wherein the displayed portion of the second frame of the video presents the representation of the object in approximately a center of the touch-sensitive display.

3. The computing system of claim 2, wherein at least one of the size of the representation of the object or the position of the representation of the object are determined based at least in part on an edge detection algorithm, an object recognition algorithm, a facial recognition algorithm, an image tracking algorithm, a motion detection algorithm, a particle tracking algorithm, a tracking learning detection (TLD) algorithm, or a video codec bit stream motion vector algorithm.

4. The computing system of claim 1, wherein the instructions when executed further cause the computing system to:
   if it is determined that the size of the representation of the object included in the second frame is larger than the identified presentation size of the representation of the object, display the second frame without altering the magnification level.

5. The computing system of claim 1, wherein the instructions when executed further cause the computing system to:
   determine a position of the representation of the object in the second frame of the video; and
   if it is determined that the representation of the object is not included in the second frame of the video, present the second frame of the video without altering the magnification level.

6. The computing system of claim 1, wherein the instructions when executed further cause the computing system to:
   determine a second portion of the second frame that does not include the representation of the object; and
   display the second portion of the second frame while displaying the at least a portion of the second frame including the representation of the object at the altered magnification level.

7. A computer-implemented method, comprising:
   causing video content to be displayed on a display;
   receiving a selection of a representation of an object in the video content;
   determining a magnification level for display of the video content based at least in part upon the representation of the object corresponding to the selection;
   determining a portion of the video content to display, the portion corresponding to the determined magnification level and including the representation of the object;
   determining a movement of the representation of the object in the video content; and
   updating the portion of the video content to display in response to the determined movement of the representation of the object in the displayed video content, the updating including adjusting the magnification level proportionate to a change in a size of the representation of the object and adjusting the portion of the video content to display to keep the representation of the object at approximately a center of the displayed portion of the video content.

8. The computer-implemented method of claim 7, further comprising:
   sending, to a remote computer system, a request indicating the representation of the object corresponding to the selection; and
   receiving, from the remote computer system, information for use in determining the portion of the video content to display, the information including at least one of, magnification level, magnification information, or tracking information corresponding to the representation of the object in the video content.

9. The computer-implemented method of claim 7, further comprising:
   receiving a magnification level corresponding to the representation of the object, wherein determining the magnification level for the video content includes determining a current size of the representation of the object in the video content and applying the received magnification level.

10. The computer-implemented method of claim 7, further comprising:
    receiving a magnification level input corresponding to the object, wherein the magnification level input is at least one of a touch-based input received at the display, an audio input received from the user, a gaze input detected from a gaze direction of a user, or a gesture input received from the user.

11. The computer-implemented method of claim 10, wherein the audio input received from the user includes an audible command to alter the magnification level of the object.

12. The computer-implemented method of claim 7, further comprising:
detecting two inputs at the display, wherein the selection corresponds to initial locations of the two inputs and the magnification level corresponds to a change in a relative location between the two inputs.

13. The computer-implemented method of claim 7, wherein the selection corresponds to at least one of a gaze input detected from a gaze direction of a user, an audible input from the user, touch-based input received at the display, or a gesture input from the user.

14. The computer-implemented method of claim 7, further comprising:
determining that information relating to the representation of the object in the video content has been previously generated, the information relating to at least one of a magnification level for displaying the video content or tracking data for tracking the movement of the representation of the object in the video content; and
providing, on the display, an indication that the information is available.

15. The computer-implemented method of claim 7, further comprising:
applying at least one smoothing process to the portion of the video content to be displayed in order to limit a rate at which the portion of the video content to be displayed can be modified.

16. The computer-implemented method of claim 7, further comprising:
enabling a user to share information about the portion of the video content via at least one social network.

17. The computer-implemented method of claim 7, further comprising:
collecting data about portions of the video content selected by a plurality of users; and
analyzing the collected data to determine one or more portions of the video content that are selected by a defined percentage of the plurality of users.

18. The computer-implemented method of claim 17, wherein the one or more portions of video content that are selected by a defined percentage of the plurality of users and identified to users when viewing the video content.

19. The computer-implemented method of claim 7, wherein the video content is segmented into a plurality of tiles configured to be concurrently displayed, the computer-implemented method further comprising:

determining a subset of the plurality of tiles corresponding to the portion; and
requesting the determined subset of the tiles for display.

20. The computer-implemented method of claim 7, further comprising:
determining a quality level for the portion of the video content to display; and
requesting that the portion of the video content to be displayed be delivered at the determined quality level.

21. A non-transitory computer-readable storage medium storing instructions that, when executed by at least one processor of a computing system, cause the computing system to at least:
receive a selection of a representation of an object in a video, the video including a plurality of frames;
determine, for at least one of the plurality of frames, a respective portion of the frame to be displayed that includes the selected representation of the object, each respective portion being determined based at least in part upon at least one of a magnification level, a size of the representation of the object in the video, or a relative position of the representation of the object in the video;
determine a change in a size of the representation of the object;
adjust the magnification level proportionate to the change in the size of the representation of the object; and
display the determined at least one of the plurality of frames without displaying a non-selected portion of the frame.

22. The non-transitory computer-readable storage medium of claim 21, wherein the magnification level is applied to only the representation of the object.

23. The non-transitory computer-readable storage medium of claim 21, wherein the instructions when executed further cause the computing system to at least:
determine a second change in the size of the representation of the object; and
display the representation of the object at the determined size.

24. The non-transitory computer-readable storage medium of claim 21, wherein the instructions when executed further cause the computing system to at least:
determine, for each frame of the plurality of frames that does not include the representation of the object, a respective portion of the frame to be displayed.

* * * * *